United States Patent
Hsu

(10) Patent No.: US 8,146,115 B2
(45) Date of Patent: Mar. 27, 2012

(54) OPTICAL DISC DRIVE WITH RESILIENT MEMBER FOR REDUCING IMPACT FORCE TO OPTICAL PICK-UP UNIT

(75) Inventor: Shih-Lung Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 941 days.

(21) Appl. No.: 12/133,386

(22) Filed: Jun. 5, 2008

(65) Prior Publication Data

US 2009/0125921 A1    May 14, 2009

(30) Foreign Application Priority Data

Nov. 9, 2007   (CN) .......................... 2007 1 0202433

(51) Int. Cl.
*G11B 7/00* (2006.01)
(52) U.S. Cl. .................... 720/671; 720/664; 720/676
(58) Field of Classification Search .................. 720/601, 720/658, 659, 663–665, 671, 672, 674–680
See application file for complete search history.

(56) References Cited

U.S. PATENT DOCUMENTS

| | | | |
|---|---|---|---|
| 7,047,541 B2 | 5/2006 | Yang | |
| 2003/0053409 A1* | 3/2003 | Okazawa et al. | 369/291 |
| 2005/0005283 A1* | 1/2005 | Storz | 720/675 |
| 2007/0050789 A1* | 3/2007 | Wang et al. | 720/607 |

FOREIGN PATENT DOCUMENTS

| | | | |
|---|---|---|---|
| CN | 1767016 A | | 5/2006 |
| JP | 2000243047 A | * | 9/2000 |
| JP | 2003249042 A | * | 9/2003 |
| JP | 2005216344 A | | 8/2005 |

OTHER PUBLICATIONS

Machine-Assisted Translation of JP 2005216344 A.*
Machine-Assisted Translation of JP 2000243047 A.*
Machine-Assisted Translation of JP 2003249042 A.*

* cited by examiner

*Primary Examiner* — Nathan Danielsen
(74) *Attorney, Agent, or Firm* — Altis Law Group, Inc.

(57) ABSTRACT

An optical disc drive for reducing impact forces in driving an optical pick-up unit is provided. The optical disc drive for driving an optical disc includes an optical pick-up unit, a guide bar, a rack, and a driving unit. The optical pick-up unit is configured for reading data from or writing data to the optical disc. The guide bar penetrates through the optical pick-up unit for supporting the optical pick-up unit. The rack engagably receives a part of the optical pick-up unit. The rack defines a slot therein. The slot extends along a direction substantially parallel with an extending direction of the guide bar. The driving unit is mechanically coupled to the rack. The driving unit drives the rack and the optical pick-up unit to move along a radial direction of the optical disc to track the optical disc.

12 Claims, 5 Drawing Sheets

OPTICAL DISC DRIVE WITH RESILIENT MEMBER FOR REDUCING IMPACT FORCE TO OPTICAL PICK-UP UNIT

BACKGROUND

1. Field of the Invention

The present invention generally relates to optical disc drive apparatuses, and particularly to an optical disc drive for reducing impact forces.

2. Description of Related Art

Conventionally, an optical disc drive includes a traverse unit mounted with an optical pick-up unit (OPU), a spindle motor, a feeding motor, and a transmission sub-assembly. The spindle motor is associated with a turntable for supporting an optical disc. The optical disc is rotated by the spindle motor at a predetermined speed for the OPU to continuously read data from or write data to the optical disc via laser beams. For tracking the optical disc, the OPU is driven by the transmission sub-assembly under control of the feeding motor to move back and forth along a radial direction of the optical disc.

The transmission sub-assembly generally includes a gear and a rack meshed with each other. The rack has a pair of bearings for a guide bar to penetrate through. The pair of bearings engages with a fixed end of the OPU. When the gear is rotated by the feeding motor, motive power is transmitted from the gear to the rack, and is then transmitted to the OPU, so that the rack and the OPU are driven to move along the guide bar accordingly.

However, if the optical disc drive accidentally falls to the ground, the impact forces may make the rack and the gear engage overly, such that the motive power is not smoothly transmitted from the gear to the rack for proper movement of the OPU along the guide bar.

Therefore, an optical disc drive for reducing impact forces in driving an optical pick-up unit is desired.

SUMMARY

Accordingly, an optical disc drive for reducing impact forces in driving an optical pick-up unit is provided. The optical disc drive for driving an optical disc includes an optical pick-up unit, a guide bar, a rack, and a driving unit. The optical pick-up unit is configured for reading data from or writing data to the optical disc. The guide bar penetrates through the optical pick-up unit for supporting the optical pick-up unit. The rack engagably receives a part of the optical pick-up unit. The rack defines a slot therein. The slot extends along a direction substantially parallel with an extending direction of the guide bar. The driving unit is mechanically coupled to the rack. The driving unit drives the rack and the optical pick-up unit to move along a radial direction of the optical disc to track the optical disc.

Other advantages and novel features will become more apparent from the following detailed description of exemplary embodiment when taken in conjunction with the accompanying drawings.

DETAILED DESCRIPTION

Figure 1:
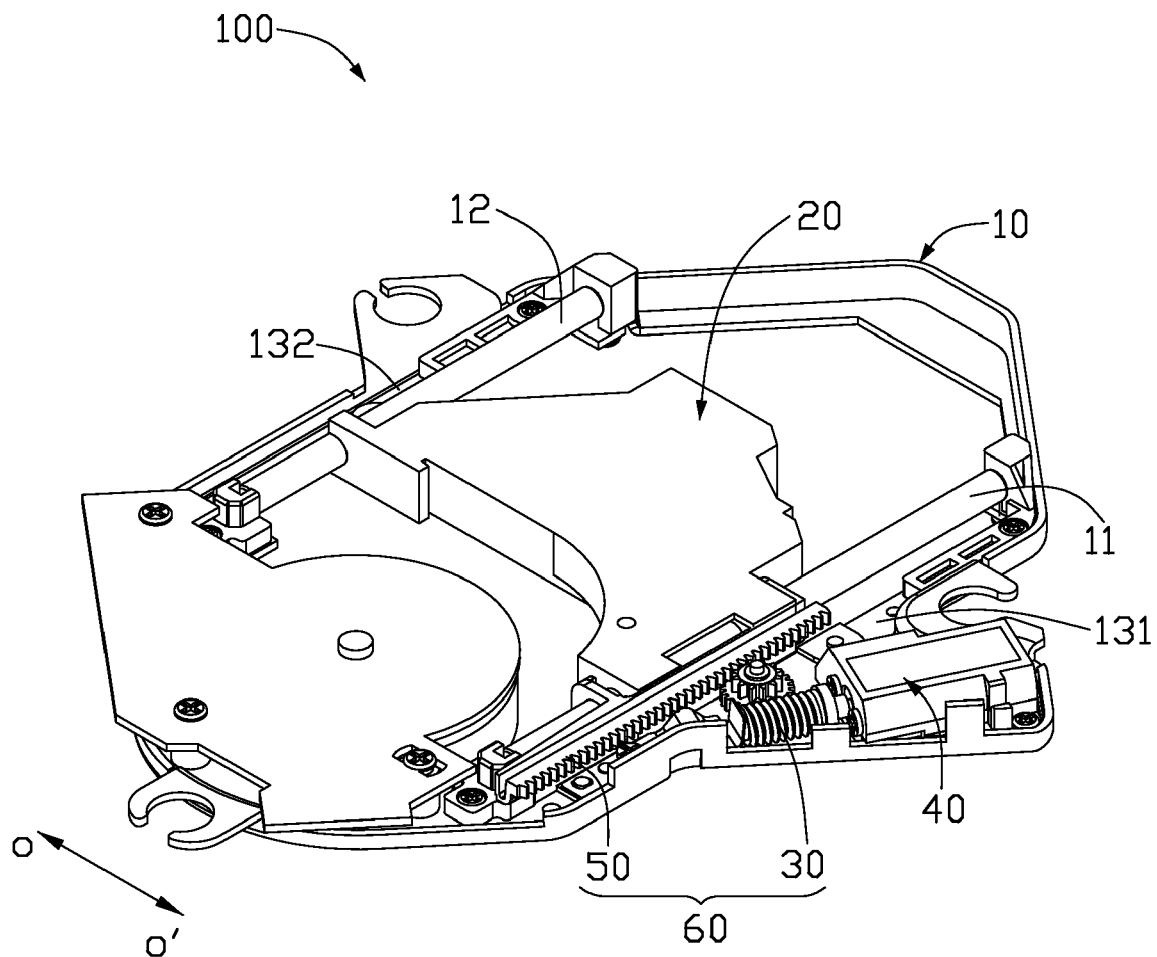
FIG. 1 is an isometric and assembled view of an optical disc drive having an optical pick-up unit and a rack in accordance with an exemplary embodiment.

Referring to FIG. 1, an optical disc drive 100 in accordance with an exemplary embodiment is illustrated. The optical disc drive 100 includes a traverse 10 mounted with an optical pick-up unit (OPU) 20 and a drive unit 60. A first guide bar 11 and a second guide bar 12 are placed in parallel at a first side 131 and a second side 132 on opposite sides of the traverse 10. The OPU 20 is slidably supported on the first guide bar 11 and second guide bar 12. The drive unit 60 is disposed at the first side 131 adjacent to the first guide bar 11. The OPU 20 is driven by the drive unit 60 to move back and forth along a path parallel to an extending direction of the first guide bar 11 and second guide bar 12.

The drive unit 60 includes a feeding motor 40, a rack 50, and gear 30 (one or more than one gear) mechanically coupled between the feeding motor 40 and the rack 50. In particular, the gear 30 is rotatably mounted onto the feeding motor 40. The rack 50 is meshed with the gear 30 for transforming a rotation movement of the gear 30 to a linear movement of the rack 50.

Figure 2:
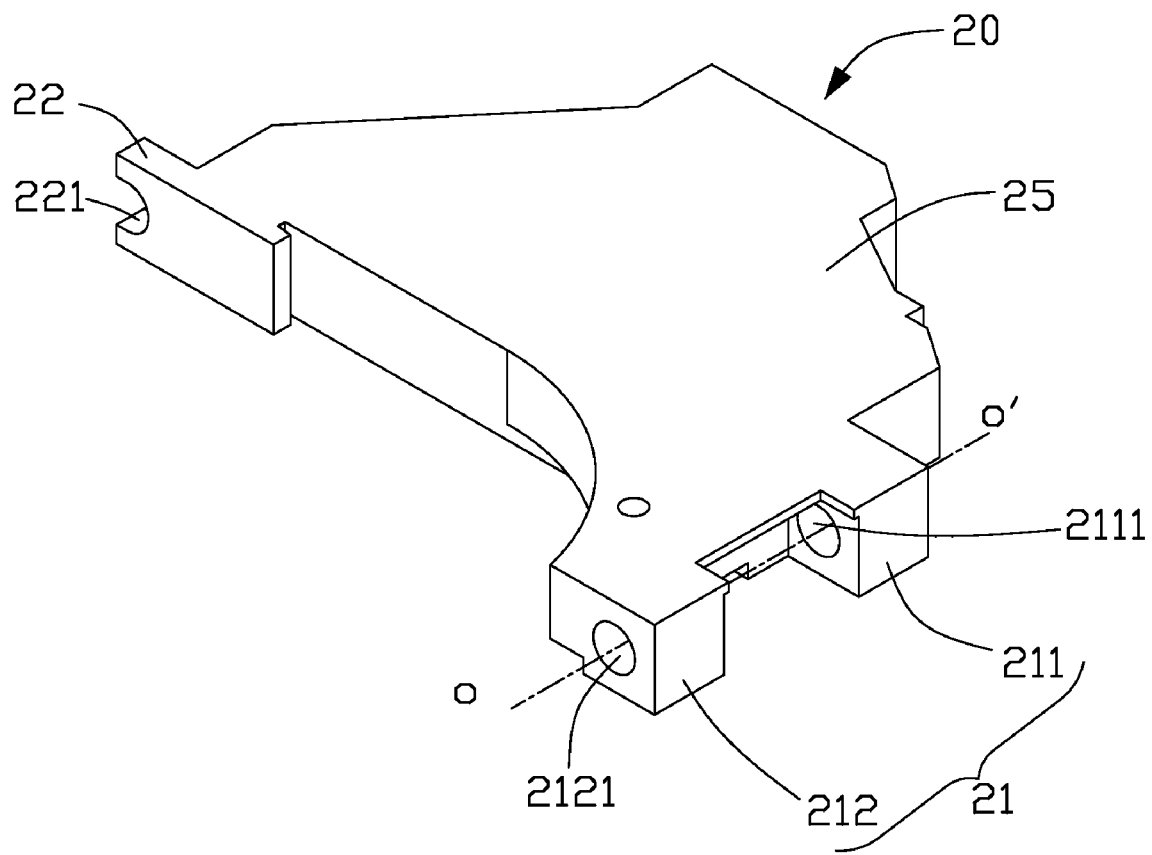
FIG. 2 is an isometric view of the optical pick-up unit shown in FIG. 1.

Referring to FIG. 2, the OPU 20 includes a holder 25 for holding a variety of optical elements such as a light source, an objective lens, and a beam splitter, etc. The OPU 20 further includes a first support part 21 and a second support part 22 formed at opposite sides of the holder 25.

The first support part 21 is provided with a first bearing 211 and a second bearing 212 that are separated by a predetermined interval. The first bearing 211 and the second bearing 212 define correspondingly a first through hole 2111 and a second through hole 2121. Diameters of the first through hole 2111 and the second through hole 2121 are slightly larger than the outer diameter of the first guide bar 11. The first bearing 211 and the second bearing 212 are configured for the guide bar 11 to protrude through the corresponding through holes 2111, 2121, such that the holder 25 can be slidably supported by the guide bar 11. The second support part 22 defines a slot 221 therein. The second support part 22 is configured for partially cramping the second guide bar 12 in the slot 221.

Figure 3:
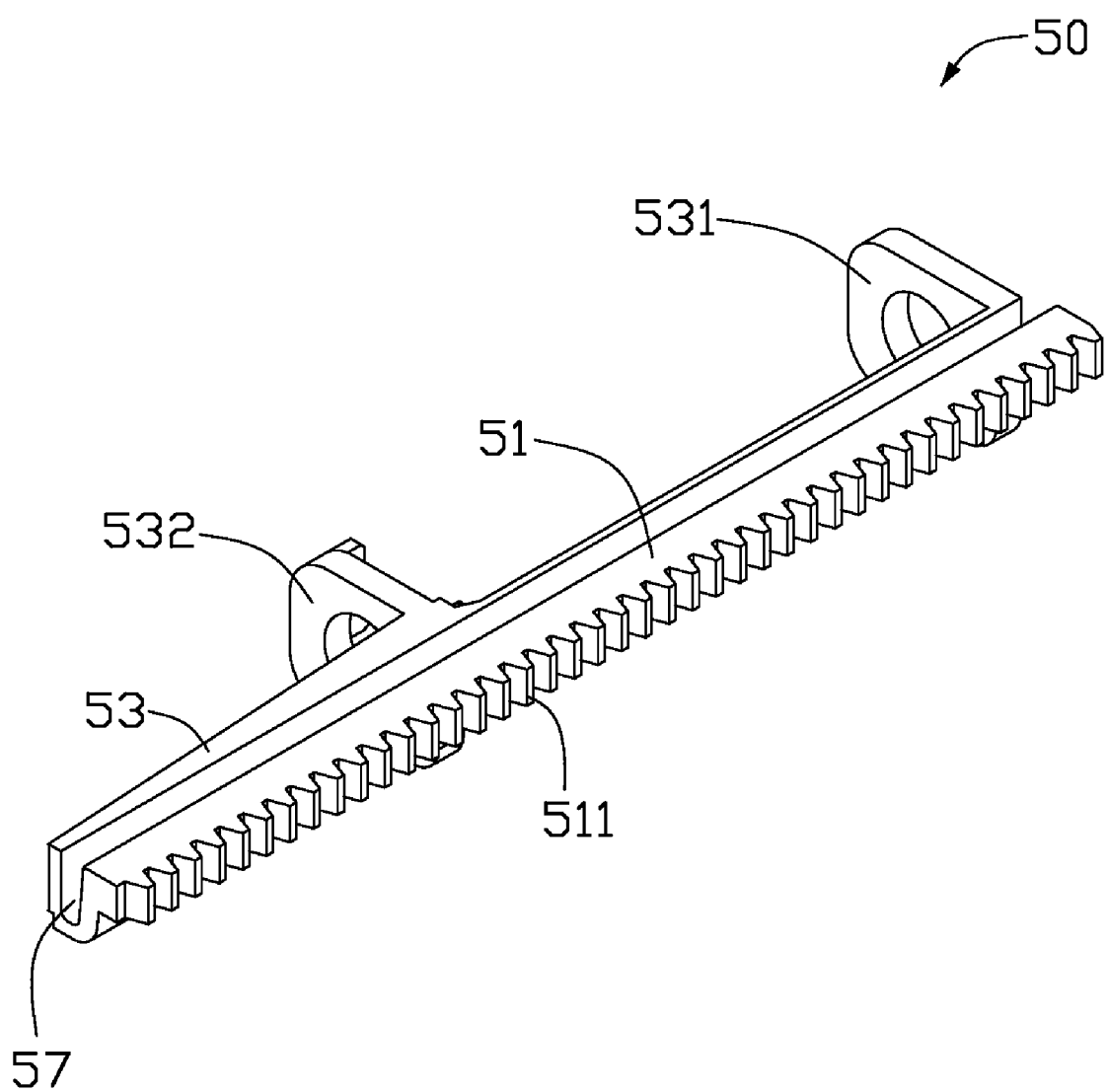
FIG. 3 is an isometric view of the rack shown in FIG. 1 illustrated in a first direction.
Figure 4:
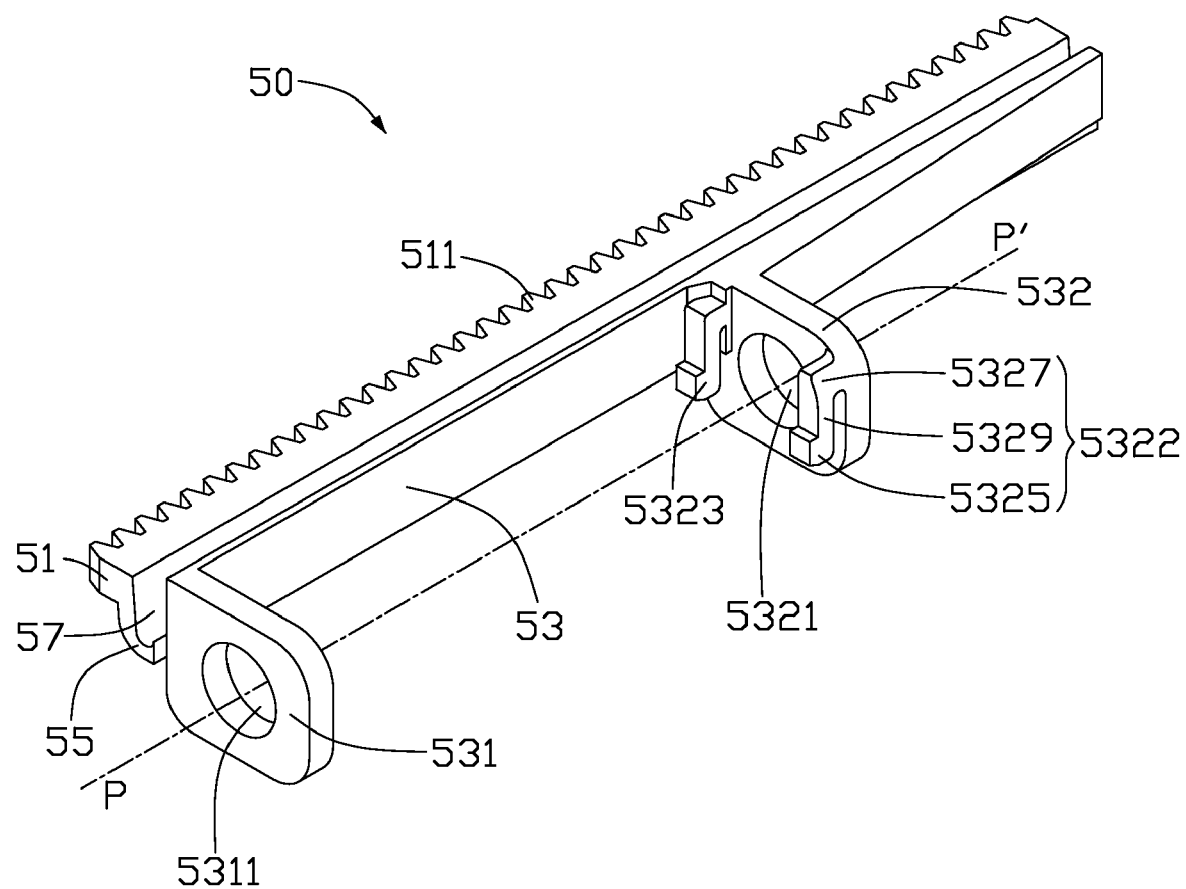
FIG. 4 is an isometric view of the rack shown in FIG. 1 illustrated in a second direction.
Figure 5:
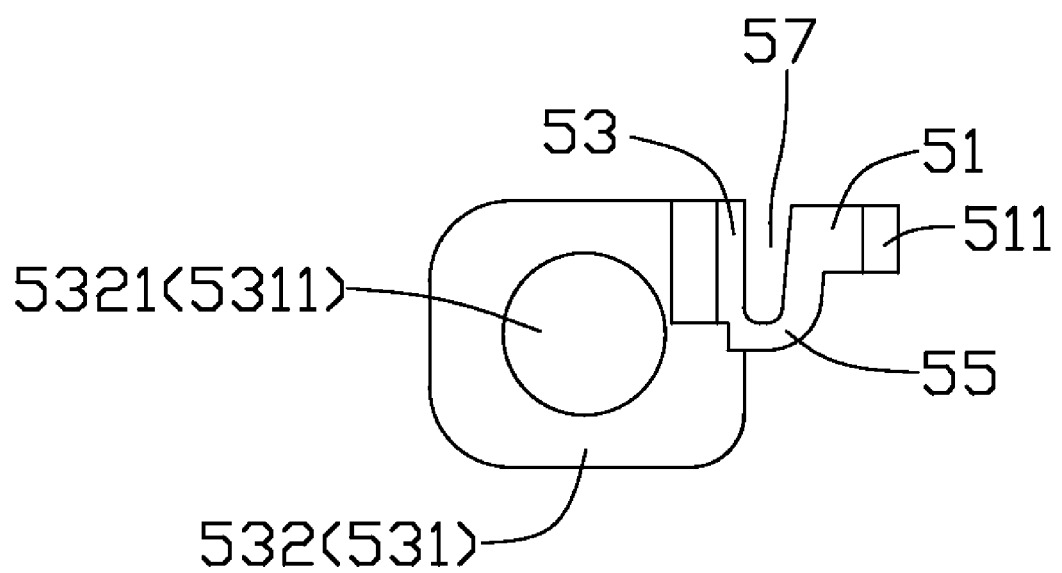
FIG. 5 is a side view of the rack shown in FIG. 4.

Referring to FIGS. 3-5, the rack 50 generally has an elongated rod shape. The rack 50 includes a first extension member 51 and a second extension member 53 that are connected by a connecting part 55. Alternatively, the first extension member 51, the second extension member 53, and the connecting part 55 may be integrally formed. The first extension member 51 and the second extension member 53 extend in parallel with each other, there by defining a U-shaped trough or slot 57 therebetween. The connecting part 55 may be resiliently formed, such that the rack 50 is able to absorb impact forces through a relative movement of the first extension member 51 and the second extension member 53 approaching each other. In other words, the U-shaped slot 57 functions as a buffer area for allowing the first extension member 51 and the second extension member 53 deforming towards each other to reduce the impact forces.

The first extension member 51 laterally forms a plurality of teeth 511. These teeth 511 are evenly spaced along an extension direction of the first extension member 51. The second extension member 53 forms a first ring 531 at an end thereof, and a second ring 532 adjacent to another end thereof. The first ring 531 and the second ring 532 extend outwards and are arranged perpendicularly to the second extension member 53.

A third through hole 5311 and a fourth through hole 5323 are respectively defined in the first ring 531 and the second ring 532, and are sized with inner diameters slightly larger than the outer diameter of the first guide bar 11.

The first ring 531 and the second ring 532 are separated at a predetermined interval between each other for properly receiving the first bearing 211 and the second bearing 212, such that the OPU 20 can be moved together with the rack 50 along the extension direction of the guide bar 11.

One side of the second ring 532 adjacent to the first ring 531 forms a pair of resilient arms 5321, 5322. The pair of resilient arms 5321, 5322 are located symmetrically with respect to the fourth through hole 5321. The resilient arm 5321 is generally Z-shaped. The resilient arm 5321 includes a free end 5325, a fixed end 5327, and a connecting portion 5329 connected to the fixed end 5327 and the free end 5325. The free end 5325 may be pressed against the second bearing 212 of the OPU 20. Therefore, impact forces imparted to the OPU 20 along a direction indicated by dotted line PP' is reduced by the deformation of the pair of resilient member 5322, 5323.

When the optical disc drive 100 is assembled, the OPU 20 and the rack 50 are supported by the first guide bar 11. The first bearing 211 and the second bearing 212 are received between the first ring 531 and the second ring 532 with interference fit. The teeth 511 of the rack 50 mesh with corresponding teeth (not labeled) of the gear 30. The gear 30 is coupled to the feeding motor 40.

In use, the feeding motor 40 drives the gear 30 to rotate. The rotation movement of the gear 30 is transformed to a linear movement of the rack 50. The rack 50 carries the OPU to move along the extension direction of the first guide bar 11, such that the OPU can properly track the optical disc.

When the optical disc drive 100 wobbles/jitters or experiences a sudden acceleration, the OPU 20 is subjected to impact forces along line OO' as indicated in FIG. 1. When the impact forces are transferred to the rack 50, the first extension member 51 and the second extension member 53 deforms towards each other, by virtue of the U-shaped slot 57, thereby absorbing the impact forces.

When the OPU 20 is subjected to impact forces along line PP' as indicated in FIG. 4, the impact forces also can be reduced by a deformation of the pair of the resilient members 5321, 5323, such that the OPU 20 is protected.

It will be understood that, although the terms first, second, etc. may be used herein to describe various elements and components, these elements and components should not be limited by these terms. These terms are only used to distinguish one element, component from another element or component. Thus, a first element, component discussed above could be termed a second element, component without departing from the teachings of the present invention.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical disc drive for driving an optical disc, comprising:
    an optical pick-up unit for reading data from or writing data to the optical disc;
    a guide bar for slidably supporting the optical pick-up unit;
    a rack comprising:
    a first extension member;
    a second extension member connected to the first extension member, the second extension member comprising two rings for passing the guide bar through, the two rings being separated at a predetermined interval for receiving a part of the optical pick up unit, the second extension member being resiliently deformed towards the first extension member to reduce a gap formed between the first extension member and the second extension member for absorbing impact forces exerted thereto; and at least one resilient arm disposed on one side of one ring which faces towards the other ring and being resiliently contacted against a portion of the optical pick-up unit that is received by the rack, wherein the at least one resilient arm is Z shaped; and
    a driving unit mechanically coupled to the first extension member of the rack, the driving unit driving the rack and the optical pick-up unit to move along a radial direction of the optical disc to track the optical disc.

2. The optical disc drive of claim 1, wherein the first extension member extend in parallel with the second extension member and define a slot therebetween, the slot extending along a direction substantially parallel with an extending direction of the guide bar.

3. The optical disc drive of claim 2, wherein the rack further comprises: the first extension member and the second extension member extend in parallel with each other where the slot is defined therebetween.

4. The optical disc drive of claim 3, wherein the slot is U-shaped.

5. The optical disc drive of claim 4, wherein each ring defines a through hole with the guide bar inserted therein, the through hole sized with a diameter larger than the outer diameter of the guide bar.

6. The optical disc drive of claim 1, wherein a width of the gap decreases when the rack is subjected to impact forces.

7. The optical disc drive of claim 1, wherein the resilient arm includes a fixed end, a free end, and a connecting part connected to the fixed end and the free end.

8. An optical disc drive comprising:
    an optical pick-up unit;
    a guide bar slidably supporting the optical pick-up unit;
    a rack engagably receiving a part of the optical pick-up unit for slidably driving the optical pick-up unit back and forth along the guide bar, the rack comprising:
    a first extension member; and
    a second extension member integrally formed with the first extension member, the first extension member and the second extension member defining a slot therebetween, the slot extending in a direction substantially parallel to an extending direction of the guide bar, the slot functioning as a buffer area for absorbing impact forces imparted to the first extension member and the second extension member, the second extension member comprising two rings being separated from each other at a predetermined interval for receiving a part of the optical pick up unit, and at least one resilient member disposed on one side of one ring which faces towards the other ring being subjected to an impact forces exerted substantially along an extension direction of the rack, wherein the first extension member laterally forms a plurality of teeth evenly spaced therewith, the two rings comprise a first ring is formed at an end of the second extension member and a second ring formed adjacent another end of the second extension member, the second ring forms a pair of the resilient members at a side adjacent to the first ring, the at least one resilient member is Z shaped; and a driving unit coupled to the rack for driving the rack and the optical pick-up unit to move along the extending direction of the guide bar to track the optical disc.

9. The optical disc drive of claim 8, wherein the gap is U-shaped.

10. The optical disc drive of claim 8, wherein the first ring and the second ring define a first through hole and a second through hole respectively for the guide bar passing therethrough.

11. The optical disc drive of claim 8, wherein the pair of resilient members are located symmetrically with respect to the second hole.

12. An optical disc drive comprising:

an optical pick-up unit;

a guide bar slidably supporting the optical pick-up unit;

a rack engagably receiving a part of the optical pick-up unit for slidably driving the optical pick-up unit back and forth along the guide bar, the rack comprising:

a first extension member; and a second extension member integrally formed with the first extension member, the first extension member and the second extension member defining a slot therebetween, the slot extending in a direction substantially parallel to an extending direction of the guide bar, the slot functioning as a buffer area for absorbing impact forces imparted to the first extension member and the second extension member, the second extension member comprising two rings being separated from each other at a predetermined interval for receiving a part of the optical pick up unit, and at least one resilient member disposed on one side of one ring which faces towards the other ring being subjected to an impact forces exerted substantially along an extension direction of the rack, wherein the first extension member laterally forms a plurality of teeth evenly spaced therewith, the two rings comprise a first ring is formed at an end of the second extension member and a second ring formed adjacent another end of the second extension member, the second ring forms a pair of the resilient members at a side adjacent to the first ring, the pair of resilient members are located symmetrically with respect to the second hole; and a driving unit coupled to the rack for driving the rack and the optical pick-up unit to move along the extending direction of the guide bar to track the optical disc.

* * * * *